US005573041A

United States Patent [19]
Skell et al.

[11] Patent Number: 5,573,041
[45] Date of Patent: Nov. 12, 1996

[54] DISPENSER CONTROL WITH ULTRASONIC POSITION DETECTION

[75] Inventors: Daniel G. Skell; Eric D. Skell, both of Cedarburg, Wis.

[73] Assignee: Electro-Pro, Inc., Cedarburg, Wis.

[21] Appl. No.: 284,004

[22] Filed: Aug. 1, 1994

[51] Int. Cl.$^6$ .................... B65B 1/04; B65B 3/04
[52] U.S. Cl. .................... 141/1; 141/94; 141/351; 73/597; 73/598; 73/610; 367/93; 367/95; 367/96
[58] Field of Search .................... 141/1, 198, 95, 141/351, 94; 73/597, 598, 599, 600, 610; 367/93, 95, 96; 4/623, 302, 304; 222/129.1

[56] References Cited

U.S. PATENT DOCUMENTS

| | | | |
|---|---|---|---|
| 3,045,445 | 7/1962 | MacLeod | 62/137 |
| 3,367,128 | 2/1968 | Hosoda | 62/137 |
| 3,731,496 | 5/1973 | Frazier | 62/137 |
| 3,863,196 | 1/1975 | Hilles | 340/1 R |
| 4,202,049 | 5/1980 | Wetzel | 367/96 |
| 4,733,381 | 3/1988 | Farmer et al. | 367/93 |
| 4,822,996 | 4/1989 | Lind | 250/222.1 |
| 4,869,287 | 9/1989 | Pepper et al. | 137/391 |
| 4,917,155 | 4/1990 | Koblasz et al. | 141/1 |
| 4,960,248 | 10/1990 | Bauer et al. | 242/55.53 |
| 5,002,102 | 3/1991 | Hösel | 141/94 |
| 5,036,892 | 8/1991 | Stembridge et al. | 141/1 |
| 5,059,812 | 10/1991 | Huber | 250/577 |
| 5,060,484 | 10/1991 | Bush et al. | 62/137 |
| 5,159,834 | 11/1992 | Eisele | 73/293 |
| 5,164,606 | 11/1992 | Secord | 250/577 |
| 5,172,595 | 12/1992 | Bush et al. | 73/290 V |

FOREIGN PATENT DOCUMENTS

1139272  1/1969  United Kingdom .

*Primary Examiner*—Henry J. Recla
*Assistant Examiner*—Timothy L. Maust
*Attorney, Agent, or Firm*—Whyte Hirschboeck Dudek S.C.

[57] ABSTRACT

A method and apparatus is provided to detect the position of an object, such as a container, within a multidimensional target space above which is a dispensing spigot to dispense water, ice, or other beverage. The dispenser control is also applicable to other applications, for example, dispensing soap in response to the detecting of human hands. The system has a transceiver emitting pulses of ultrasonic waves, a portion of which are reflected by the object in the target space and detected by the transceiver, and a processing circuit for determining the relative strength of the reflected signals and the time it takes an ultrasonic wave to be emitted, reflected, and received by a transceiver. The received signal is checked to determine if the amplitude of the reflected ultrasonic wave is consistent with an object occupying the target space. A timer circuit creates a timing window which further defines the target space. When a reflected ultrasonic wave has large enough amplitude and occurs within the timing window, a dispensing signal is produced. An instant OFF stops dispensing as soon as the object begins to leave the target space, thereby preventing spillage.

35 Claims, 11 Drawing Sheets

DISPENSER CONTROL WITH ULTRASONIC POSITION DETECTION

BACKGROUND OF THE INVENTION

The present invention relates generally to a dispenser control with ultrasonic position detection for detecting the presence of an object within a predetermined volumetric target space. Specifically, the invention is applied to detecting the position of a cup, or other similar container, and when the cup is substantially within the volumetric target space, a dispensing spigot located above the cup is activated to dispense a beverage or ice into the container located in the target space.

Generally, a beverage and ice dispenser consists of a mechanical push rod closing an electric switch or a manually operated push-button electric switch which actuates a dispenser to dispense product. It is thought that such dispensers transmit communicable diseases. For example, a person with such a disease who drinks out of a cup and returns to the dispenser to refill the cup must contact the cup to the dispensing push rod such that germs may be transferred from the cup to the push rod wherein the next individual to use the mechanical dispenser may come in contact with the germs by drinking from a cup subsequently placed against the same push rod.

Heat sensing devices which are typically used for activating water faucets in response to sensing heat generated by the operator's hand within a certain proximity of the faucet are not very accurate in determining position because of their temperature dependency. Heat sensing devices are activated when an object of a given temperature is at a certain proximity to the heat sensing device. However, if the temperature is lower than the temperature expected at the given proximity, the device will not be activated until the object with lower temperature is brought closer to the heat sensing device which shortens the expected proximity. In other words, an object's distance from the heat sensing device, to activate the device, will vary with temperature and therefore will not give precise and predictable results.

Another type of position sensing device is a light beam interrupter system in which a beam of infrared light is transmitted to a photodetector mounted opposite the infrared transmitter which transmits a steady light beam and wherein the interruption of the light beam indicates the presence of an object therebetween. For example, see U.S. Pat. No. 4,822,996 issued to Lind. This type of system is only capable of determining whether an object is present between the transmitter and the receiver and not the proximity or position of an object. In other words, this type of a detector would only function on a single axis.

An alternative transmitter and receiver arrangement was provided by Hösel, U.S. Pat. No. 5,002,102 which emits a steady beam of light from a transmitter which is reflected back to a receiver mounted adjacent the transmitter. The Hösel system requires a microcomputer with a microprocessor for calculating a distance between the transmitter/receiver and the fill level in a bin—the distance being an inverse function of the intensity of the light beam. The Hösel apparatus is based on direct reflection, that is, it simply emits light and determines how much is returned to determine the fill level distance and is therefore limited to detection on a single axis, and unless confined within a closed system such as the fiber storing bin disclosed by Hösel, the Hösel device would be susceptible to stray light sources and be inoperative in the presence of such stray light sources.

An ultrasonic level control circuit is disclosed in U.S. Pat. No. 5,060,484 by Bush, et al. which also is limited to detection on a single axis since it is a linear distance measurement system for controlling the fill level of ice in a bin. The ultrasonic transmitter and receiver sends ultrasonic signals toward the surface of the ice and measures the amount of time necessary for the echo, or reflected, signal to return. This system is limited to enclosed areas wherein echo signals are continuously expected, and if one is not received, it is defined as an error and the system is disabled which is not desirable in a dispenser.

The main disadvantage of these prior systems is that they are limited to detection on a single axis and therefore are not true position detection devices. In other words, a light beam interrupter system detects an interruption in the light beam anywhere in the linear axis defined to extend from the light emitting source to the light receiving detector, and cannot differentiate the position of the interruption along that linear axis. A heat sensing device may be able to detect on multiple axes, but unless the temperature of the intruding object is constant, the point of detection varies with the temperature of the object, and therefore true position detection cannot be achieved. Further, fill level controls are not adaptable to dispensing since they are limited to closed systems and only detect on a single axis. Similarly, distance measurement, whether using light or sound, has not been perfected to detect on multiple axes, as is required to detect the presence of a container under a dispensing spigot to provide hands free dispensing.

SUMMARY OF THE INVENTION

The present invention overcomes the disadvantages of the prior art devices by using ultrasonic waves to detect the position of an object, such as a container or a cup, and accurately dispensing ice, water, or other beverage into the container without spilling the dispensed product. The dispenser control is also applicable to other applications, for example, the invention may be applied to dispensing soap in response to the detection of human hands. For clarity, the invention is further described with reference to dispensing product into a cup.

The ultrasonic position detection method and apparatus automatically dispenses product by defining a volumetric target space located directly under a dispensing spigot and only activating the dispenser when the cup is substantially situated in the target space so that dispensed product enters the cup without spilling. In other words, the leading edge of the cup must pass the spigot and the trailing edge must not in order to occupy a sufficient amount of the target space to activate dispensing.

The present invention uses an ultrasonic transceiver which has a transmitter portion and a receiver portion. The transmitter portion emits ultrasonic waves, while the receiver portion detects ultrasonic waves and converts the ultrasonic waves to electrical signals. The system uses a clock circuit to trigger the transmitter portion of the transceiver to emit a short series of ultrasonic pulses having a cone-shaped dispersion path which generally defines an outer boundary of the target space. Portions of the ultrasonic waves are reflected by objects in the dispersion path and directed back to the transceiver. The receiver portion of the transceiver receives the reflected ultrasonic waves and provides an electrical signal having an amplitude which is proportional to the distance the object is from the transceiver. The reflected ultrasonic signal is amplified and checked in an amplitude detector to determine if the relative amplitude of the reflected ultrasonic signal is large enough to indicate that enough of the cup is sufficiently within the outer boundaries of the target space both laterally and vertically.

The control circuitry includes a timing circuit to set minimum and maximum time limits that the ultrasonic wave can be emitted, reflected, and received. These time limits create a timing window which determine the minimum and maximum boundaries of the target space as measured from the transceiver. If a reflected ultrasonic signal has large enough amplitude to be detected by the amplitude detector and it occurs within the timing window, an ON-delay circuit begins to run. The ON-delay circuit provides not only a means to eliminate errant signals, but also allows sufficient time to adequately stabilize the cup in position under the dispensing spigot. This is accomplished by requiring multiple, successive reflected ultrasonic signals having sufficient amplitude and occurring in the timing window before the dispenser is activated. A missing pulse detector is provided to immediately stop dispensing when an amplitude signal does not occur synchronously with the timing window. The control is also equipped with a disabler to ignore false echoes, or rings, caused by the vibration of the transceiver transmitting.

In operation, when the cup enters the volumetric target space, a portion of the ultrasonic wave emitted from the transceiver is reflected off the cup and back toward the transceiver. A proportionally greater portion of the ultrasonic wave is reflected back as the cup occupies more of the volumetric target space. The amplitude detector compares the amplitude of the reflected signal to a predetermined reference signal and produces an output only if the reflected signal is greater than the predetermined signal.

The system can accurately detect when a cup is in the target space and dispense ice, water, or other beverage into the cup without spilling and without the need for physical contact with a switch or activating rod—in this regard, the present invention provides a hands-free method and apparatus for dispensing. Because the present invention uses both a timing circuit for creating a timing window and an amplitude detector to detect the relative amplitude of the reflected signal, the invention is capable of detecting the presence of a container on three axes. Multiple axes detection is preferred in a dispenser to ensure that at least the-minimum sized cup is within the target space and to discontinue dispensing when the cup no longer occupies a sufficient amount of the target space regardless of the direction of removal. For example, if the cup is too far from the transceiver or too close to the transceiver such that dispensed product would not enter the cup without spilling, the reflected signal will not occur during the timing window created by the circuit timer and no dispensing will occur. Further, if the cup is too high, or too low, or too far left or too far right, the amplitude of the received signal will not be strong enough to trigger the amplitude detector and even though a reflected signal may occur during the timing window, the dispenser will not activate. The reflected signal must trigger the amplitude detector within the timing window or dispensing will not be activated, or will be disabled if the system is in the process of dispensing.

The method for automatically dispensing water, beverage, or ice with ultrasonic position detection is preferably implemented with discrete circuitry. However, the method may also be implemented with a microprocessor and software. A block diagram, a flow chart, and a timing diagram are provided for this purpose. Additional benefits and advantages of the present invention will become apparent from the subsequent detailed description of the preferred embodiment, the drawings, and the claims.

DETAILED DESCRIPTION OF THE PREFERRED EMBODIMENT

Figure 1:
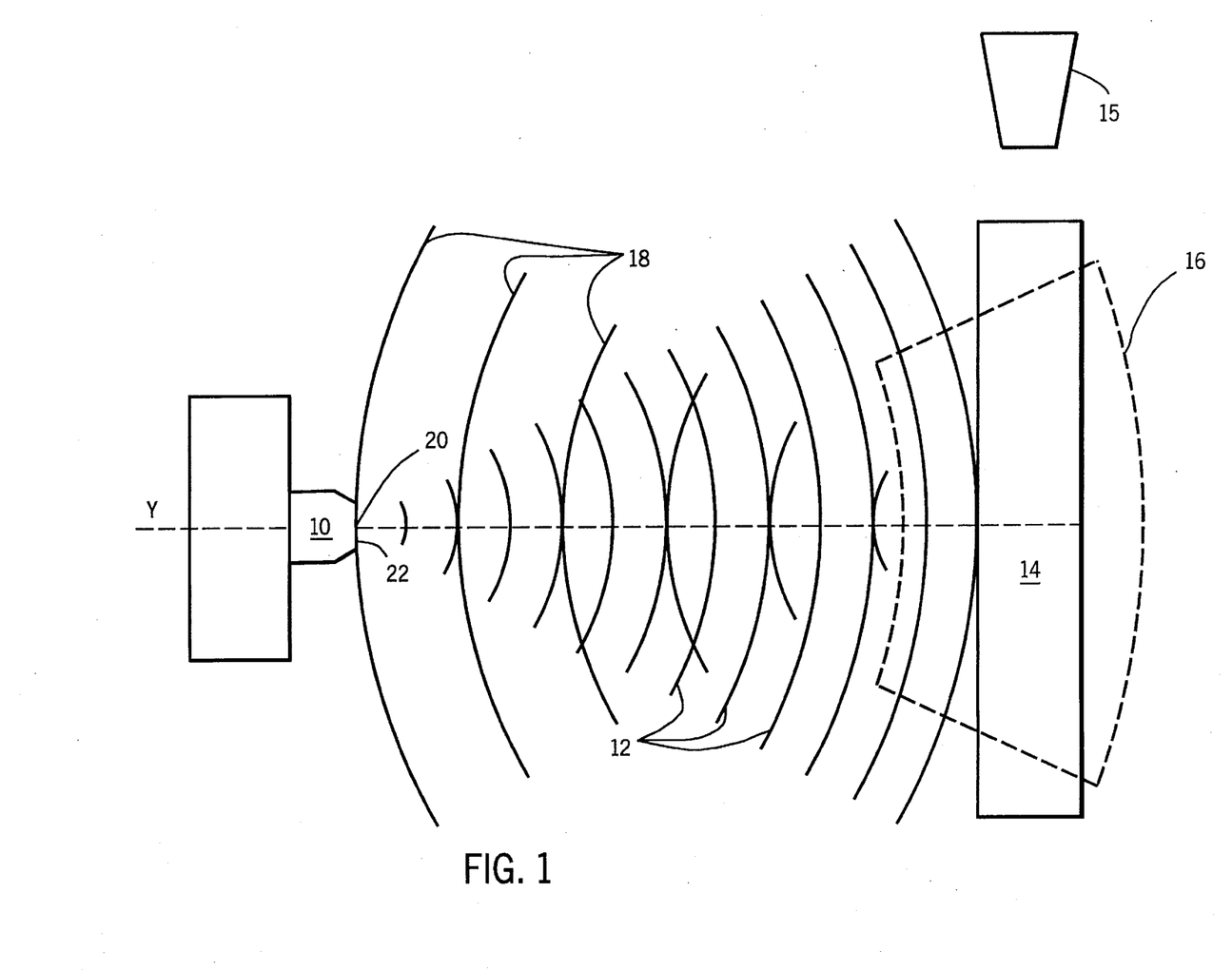
FIG. 1 is a schematic illustration in side plane view of a system in accordance with the invention.

Referring to FIG. 1, transceiver 10 emits pulses of ultrasonic waves 12 which are reflected off a cup 14 located under a dispensing spigot 15 and in volumetric target space 16. The reflected ultrasonic waves 18 are received, or detected, by transceiver 10. Transceiver 10 has a transmitter portion 20 and a receiving portion 22.

Figure 2A:
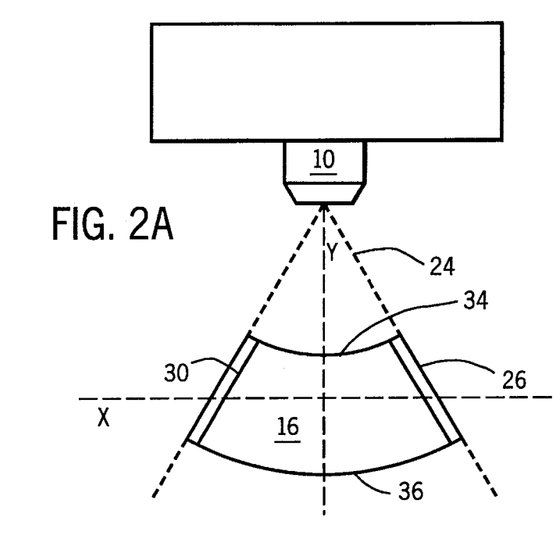
FIGS. 2A–C are top plane view, horizontal plane view and side elevation view, respectively, of the system of FIG. 1.
Figure 2B:
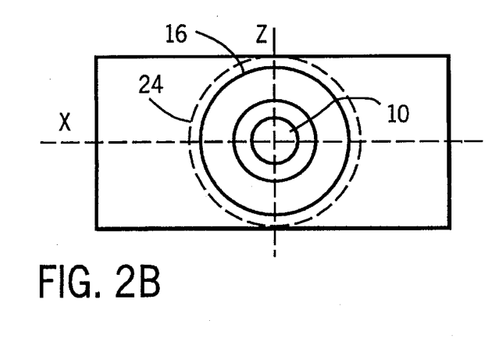
Figure 2C:
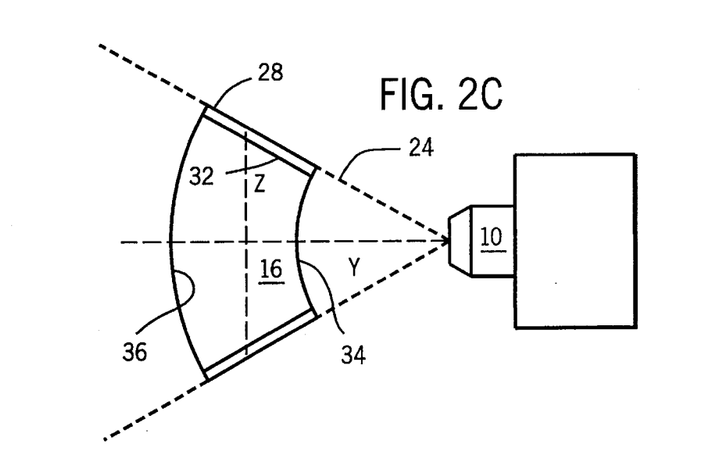

FIGS. 2A, 2B and 2C show the volumetric target space 16 in a top plane view, horizontal plane view, and side elevation view, respectively. The ultrasonic waves emitted by transceiver 10 have a cone-shaped dispersion path 24 defining a lateral-most boundary 26, FIG. 2A, and a vertical-most boundary 28, FIG. 2C, of target space 16. Preferably, a lateral boundary 30, FIG. 2A, of target space 16 is set somewhat less than lateral-most boundary 26. Similarly, a vertical boundary 32, FIG. 2C, is set less than vertical-most boundary 28. Setting the lateral and vertical boundaries less than the cone-shaped dispersion path of the emitted ultrasonic waves 24, defines a predefined target space 16 which is independent of tolerances in the dispersion path of transceiver 10. In this manner, a target space with predefined limits can be readily produced regardless of tolerances in transceiver 10.

The volumetric target space 16 is further defined on the Y-axes as shown in FIGS. 2a and 2c. Target space 16 has minimum distance boundary 34 and maximum distance boundary 36 which define the target space on the Y-axes.

Figure 3:
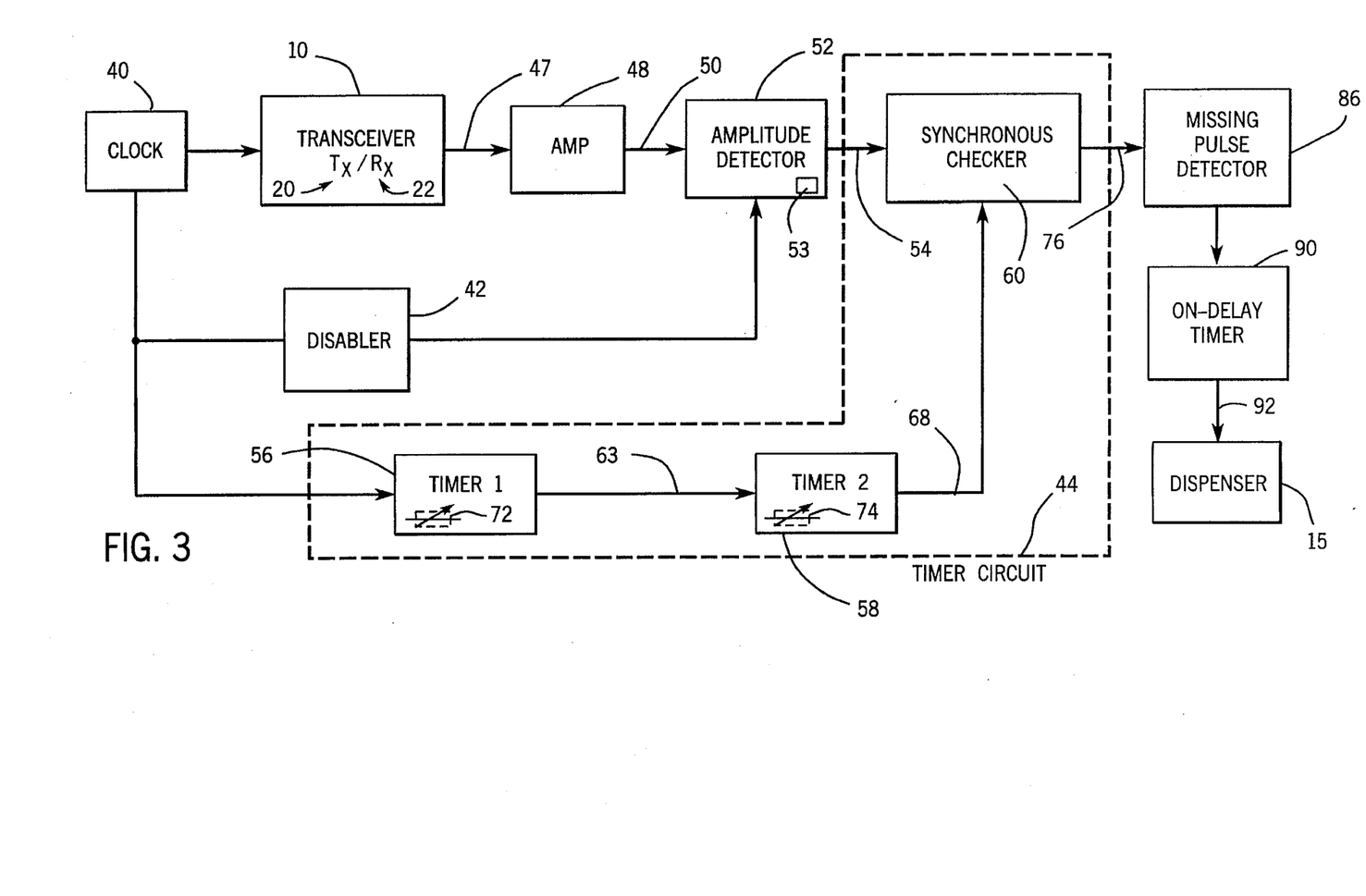
FIG. 3 is a block diagram in accordance with the invention.

FIG. 3 shows a block diagram of a circuit used to implement the ultrasonic position detector. Clock 40 is connected to transceiver 10, disabler 42, and timer circuit 44. Transceiver 10, which comprises a transmitter 20 and receiver 22, emits a series of short ultrasonic waves in response to a triggering signal from clock 40. Transceiver 10 emits a periodic series of pulses 46, FIGS. 4 and 5, preferably at 40 kHz. After the pulses are reflected off a cup 14, FIG. 1, in target space 16, the receiver portion of transceiver 10, FIG. 3, detects the reflected ultrasonic waves. Transceiver 10 is connected to amplifier 48 which amplifies the reflected signal 47. Amplifier 48 is connected to amplitude detector 52 which is also connected to disabler 42. Amplitude detector 52 compares the amplified signal 50 to a predetermined reference signal 53. Amplitude detector 52 is connected to disabler 42 to effectively disable the receiving portion of the system during periods of transmission, the purpose of which is described later with reference to FIG. 4.

Amplitude detector 52 produces an amplitude signal 54 when the amplified amplitude of a reflected ultrasonic signal is greater than the predetermined reference signal 53, thereby indicating the cup 14, FIG. 1, is sufficiently within the target space on the X-axes, FIGS. 2A and 2B, and the Z-axes, FIGS. 2B and 2C.

The amplitude detector 52, FIG. 3, and clock 40 are connected to a timer circuit 44 which comprises a first timer 56, a second timer 58, and a synchronous checker 60. First timer 56 begins timing when transceiver 10 begins to emit ultrasonic signals and produces a first timer output 63. Timer 56 runs for a predetermined time 64, FIG. 5, and when timer 56 times out at 66, it triggers second timer 58, FIG. 3, which produces a second timer output 68 to synchronous checker 60. The length of time second timer 58 produces the second timer output 68 creates timing window 70, FIGS. 4 and 5, and defines minimum and maximum distances 34 and 36, FIGS. 2A and 2C, of the target space as measured from transceiver 10 on the Y-axes. First timer 56, FIG. 3, and second timer 58 have potentiometers 72 and 74, respectively, to adjust the first and second timer outputs. Adjusting potentiometers 72 and 74 vary the time each of the timers produce an output. In other words, varying potentiometer 72 of first timer 56 varies the time 64, FIG. 5, of first timer output 63 and varies the leading edge of timing window 70. Similarly, adjusting potentiometer 74 varies the trailing edge of timing window 70 of second timer output 68.

Synchronous checker 60, FIG. 3, is connected to amplitude detector 52 and second timer 58 to produce a dispense signal 76 when an amplitude signal 54 occurs substantially synchronously within timing window 70. For example, referring to FIG. 4, amplifier output examples A, B, and C show rings 78, caused by the emission of pulses 6, and echoes 80, 82, and 84, respectively. Of the three echoes shown, only echo 80 will cause synchronous checker 60, FIG. 3, to produce synchronous signal 76 because echo 80 occurs in timing window 70 and has amplitude greater than reference amplitude 53.

Missing pulse detector 86, FIG. 3, receives synchronous signals 76 and produces an output signal as long as the synchronous signals 76 are continuous. In other words, in the event a single synchronous signal 76 is absent within a period of time slightly longer than the 2 ms. transmission time, as shown at reference 88, FIG. 5, missing pulse detector 86, FIG. 3, immediately goes low thereby turning dispenser 15 off. If dispenser 15 is off and synchronous checker 60 produces a synchronous signal 76, missing pulse detector 86 produces a high to the ON-delay timer 90 which delays dispensing a predetermined amount of time to ensure the cup is in position under the dispenser 15, FIG. 1. For example, a delay of 100 ms. is sufficient. Once the ON-delay timer 90, FIG. 3, times out, a dispense signal 92 is produced to turn on dispenser 15.

Disabler 42 is connected to amplitude detector 52 and clock 40, and disables amplitude detector 52 a predetermined period of time, for example 400 μs. Such disablement is required to prevent the receiver portion of transceiver 10 from reacting to rings 78, FIG. 4, which occur when transceiver 10 emits pulses 46 causing vibrations which are received by the receiver portion of transceiver 10. Disabler 42 provides a means for the system to ignore such errant signals.

Figure 4:
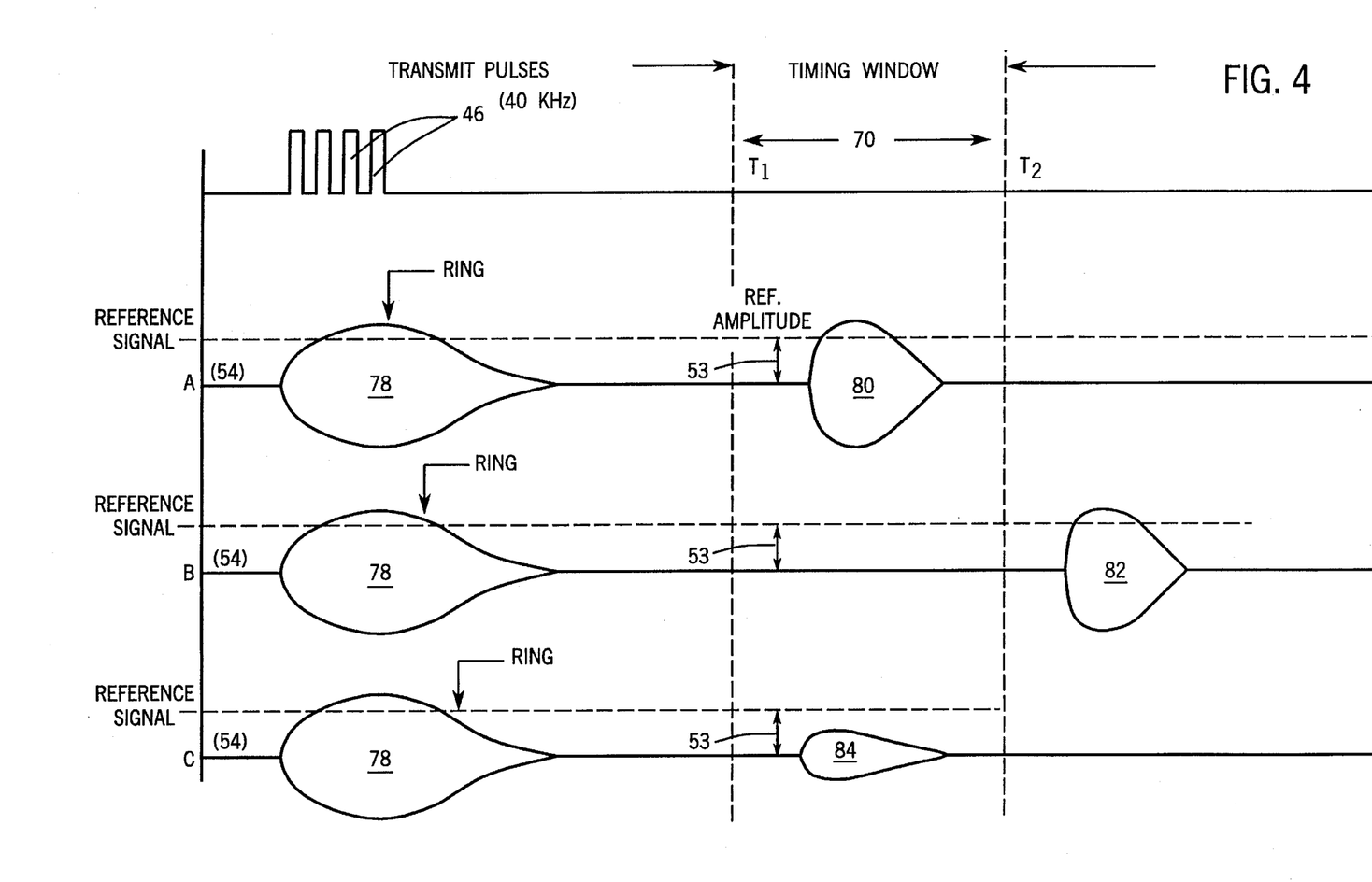
FIG. 4 is a timing diagram illustrating various states of operation in accordance with the invention.

FIG. 4 is a timing diagram showing various states of operation. In example A, echo 80 is the result of a cup being sufficiently within the target space defined by timing window 70 and reference amplitude 53. Example B has echo 82 which has an amplitude greater than reference amplitude 53, but occurs outside timing window 70 indicating a container directly in front of the transceiver, but outside timing window 70—i.e. the container is too far from transceiver 10. The amplitude can be larger than the reference amplitude and not occur within the timing window 70 because a container directly in front of transceiver 10 on the Y-axes, FIG. 2C, will reflect a stronger ultrasonic wave directly back to transceiver 10 than if container 14 were slightly offset. Example C, FIG. 4, shows echo 84 occurring within timing window 70 but having an amplitude less than the reference amplitude 53 indicating a container within the permissible distances from transceiver 10, but on an outer edge of the target space which will not be sufficiently within the target space to enable dispensing.

Figure 5:
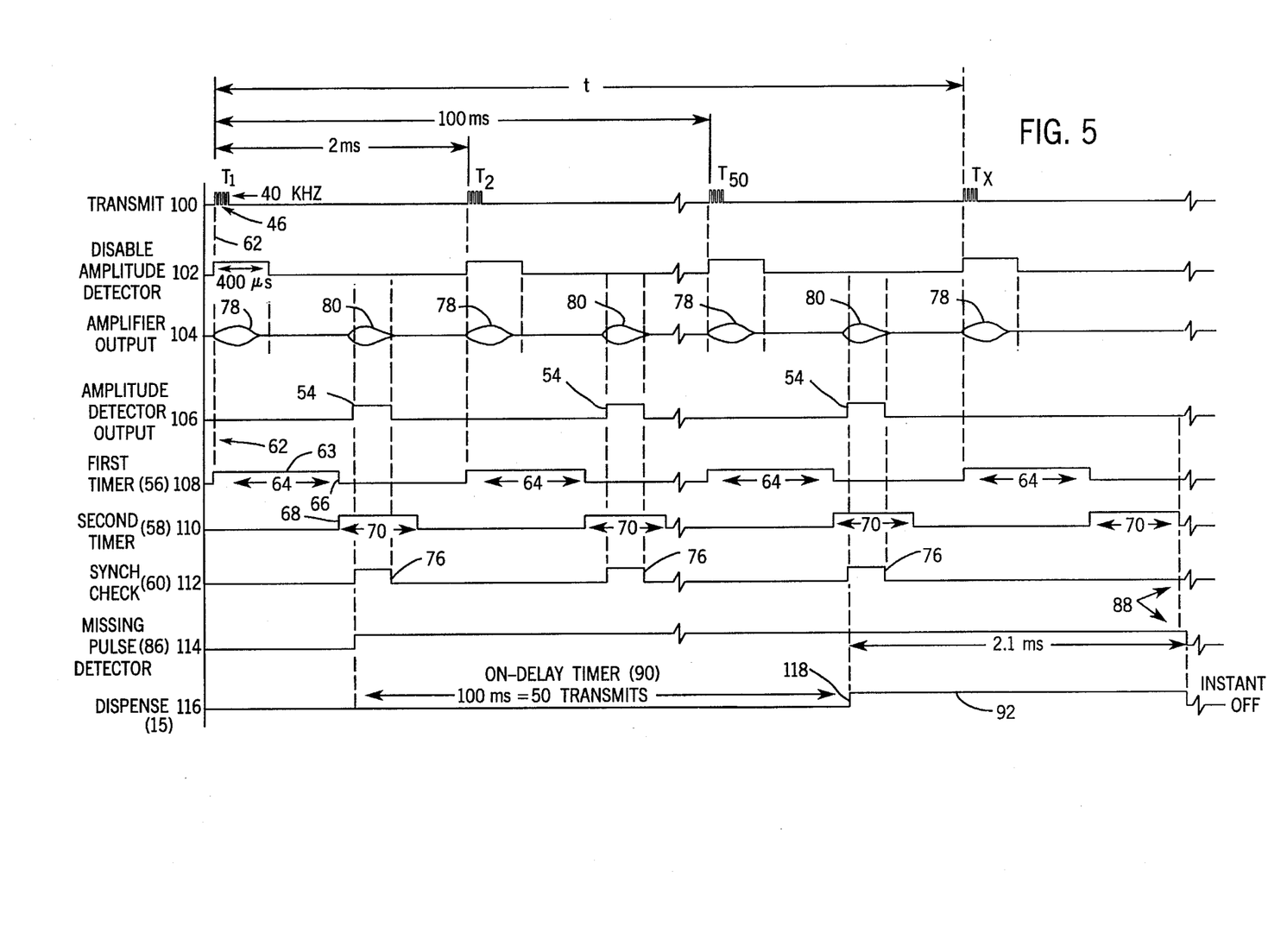
FIG. 5 is a timing diagram of the system in accordance with the invention.

FIG. 5 is a timing diagram showing several cycles of the system in operation. As shown by transmit line 100, the transceiver will transmit four short pulses of ultrasonic waves at 40 kHz shown as $T_1$, $T_2$, ... $T_X$. Time line 102 shows that amplitude detector 52, FIG. 3, is disabled by disabler 42 with every transmission occurrence to ignore rings 78 of time line 104. Time line 104 also shows echoes 80 corresponding to a reflected signal having a large enough amplitude for the amplitude detector to create amplitude signals 54 on time line 106. As previously described, first timer 56 begins timing with each transmission and second timer 58 begins timing when first timer 56 times out. Time line 110 shows timing window 70 created by first timer 56 and second timer 58 and potentiometers 72 and 74, respectively. Time line 112 has synchronous signals 76 when echo 80 has sufficient amplitude to create amplitude signal 54, on time line 106, substantially synchronously with timing window 70 of time line 110. Time line 114 shows missing pulse detector 86 go high at the first occurrence of a synchronous signal 76 and staying high until the absence of a synchronous signal 76, as shown at reference line 88. The missing pulse detector has an internal timer which resets with every synchronous signal 76 and times out at a time slightly past timing window 70. For example, transmission $T_X$ on time line 100, has no corresponding echo 80 on time line 104 as do transmissions $T_1$, $T_2$, ... $T_{50}$, thereby indicating that the cup is being removed from the target space. Therefore, when timing window 70 on time line 110 has ended, and no synchronous signal occurs on time line 112, the internal timer of missing pulse detector 86 times out, as shown slightly past reference line 88, and instantly interrupts the dispense signal 92. Time line 116 shows the delay of ON-delay timer 90 which runs for 100 ms. from the time missing pulse detector 86 goes high, which corresponds to transmission. $T_{50}$, where each transmission is at 2 ms. intervals. Dispense signal 92 is created at the end of the ON-delay at transition 118 which activates dispensing.

Figure 6:
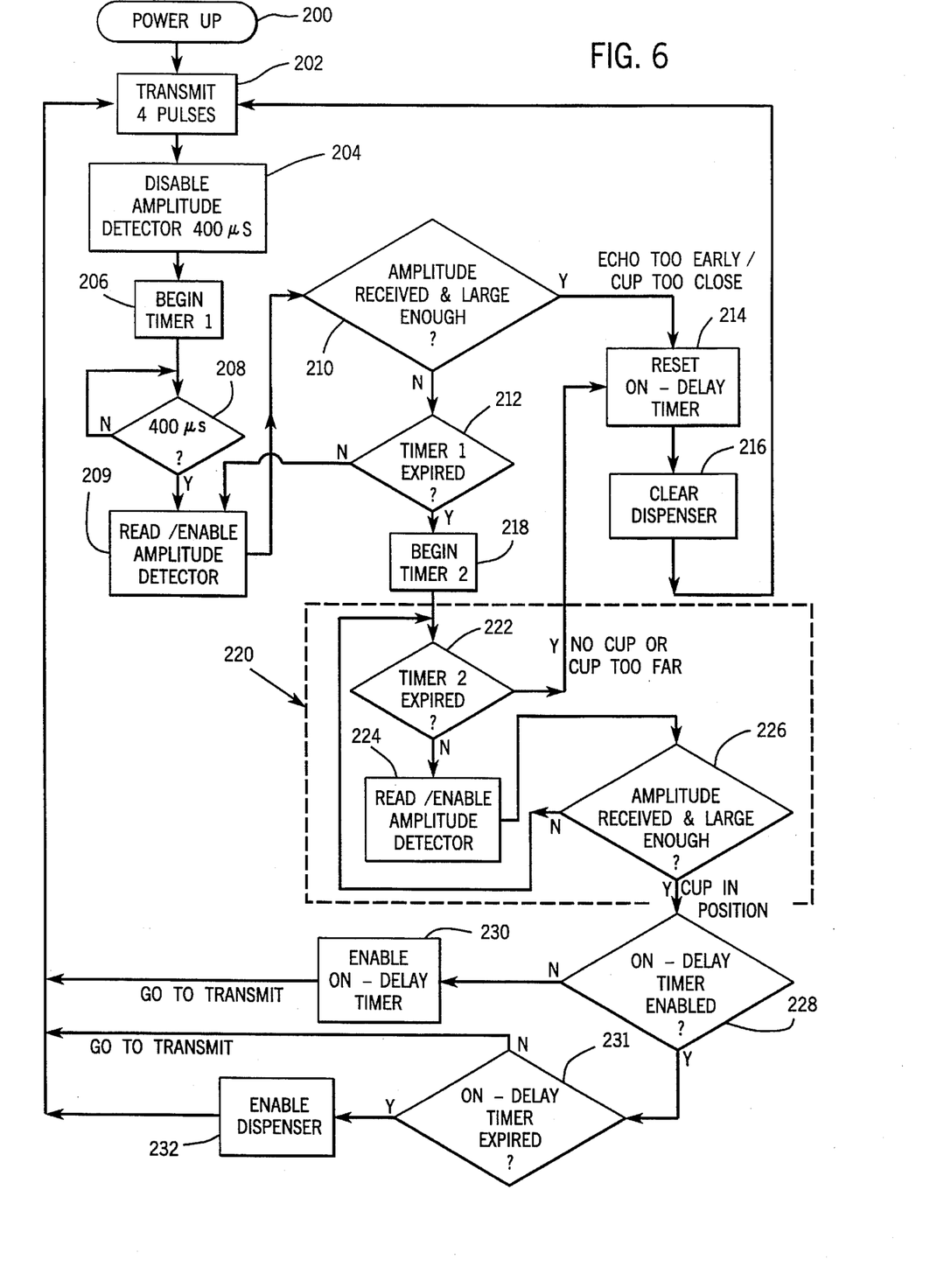
FIG. 6 is a system flow chart in accordance with the invention.
Figure 7:
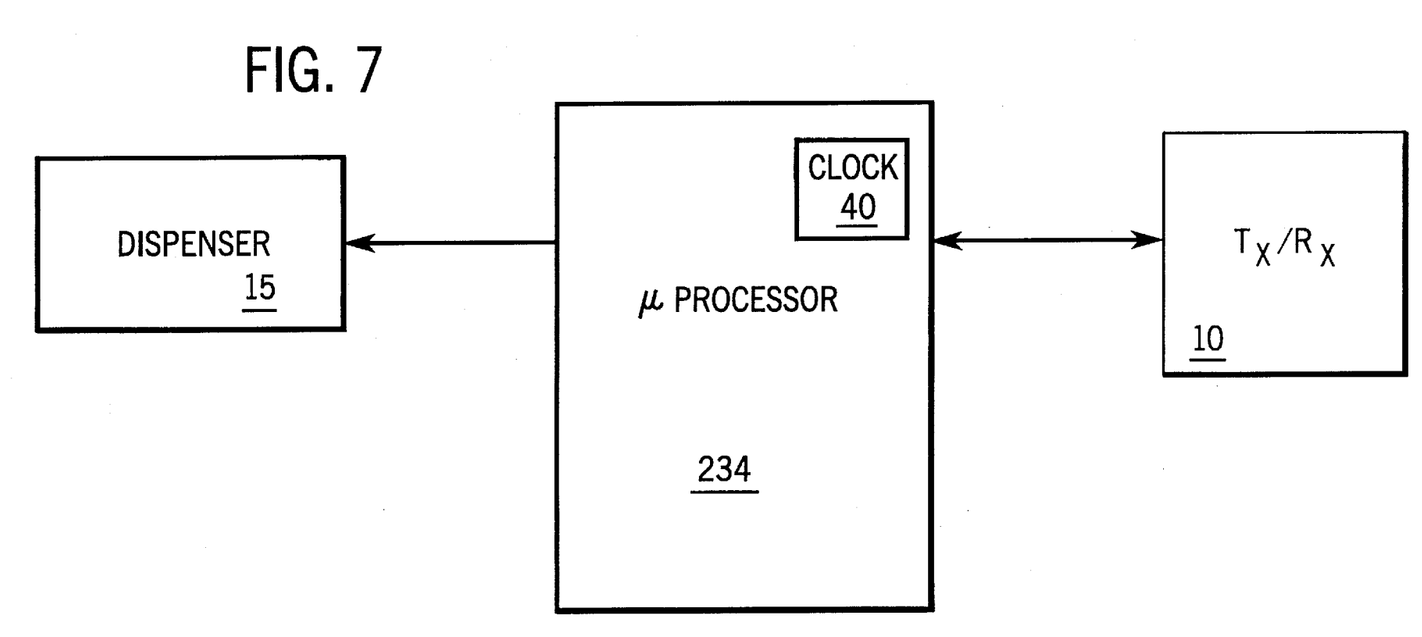
FIG. 7 is a circuit schematic of a system in accordance with the invention.

FIG. 6 is a flow chart to implement the system with software and a microprocessor which is connected in a well known manner as shown in FIG. 7. Block 200 shows the system being powered up and proceeding to transmit a series of pulses 202 while simultaneously disabling amplitude detector 204 and beginning the first timer 206. After allowing sufficient time to ignore errant rings 208, the amplitude detector is enabled 209 and the amplitude of a received signal is tested to ensure that it is large enough to be within the target space 210.

If the amplitude is large enough and the first timer is not expired 212, then the echo was too early signifying that the cup is too close to the dispenser. In that case, the ON-delay timer is reset 214, the dispenser is cleared 216, and the system begins transmitting again at 202. It should be noted that because the first timer 206 is considerably longer than the 400 μs timer 208, the amplitude decision block 210 can occur prior to checking to see if the first timer has expired 212.

If no amplitude is received, or an amplitude is received and is not large enough 210, the system checks to see if the first timer has expired 212, and if not, it continually checks the amplitude until the first timer is expired. The expiration of the first timer starts the second timer 218. Reiterative block 220 defines the timing window 70 of FIG. 4, and consists of ensuring that the=second timer has not expired 222, reading the amplitude=detector 224, and checking to see if any received amplitude is large enough 226. If no signal is received, the reiterative block 220 repeats until the second timer expires, thereby indicating that no cup is in position or that the cup is too far from the transceiver at which point the ON-delay timer is reset 214, the dispenser is cleared. 216, and the system transmits again 202. However, if a signal is received 224 and the amplitude is large enough 226, before the second timer has expired 222, a cup is in position and the ON-delay timer is checked to see if it was previously enabled 228. If not, the ON-delay is enabled 230 and the system goes back to transmitting 202. If the ON-delay timer has already been enabled in a previous cycle 228, then the ON-delay timer is checked to see if it has expired 231 and if not, the system again goes back to transmitting 202. If the ON-delay timer has expired 231, thereby ensuring that a cup is in position, the dispenser is enabled 232 to dispense product into the positioned cup and the system again transmits 202.

FIG. 7 shows microprocessor 234 and an internal clock 40. The microprocessor is connected in a well known manner to the transceiver 10 and dispenser 15. The microprocessor is implemented via the flow chart of FIG. 6.

Figure 8A:
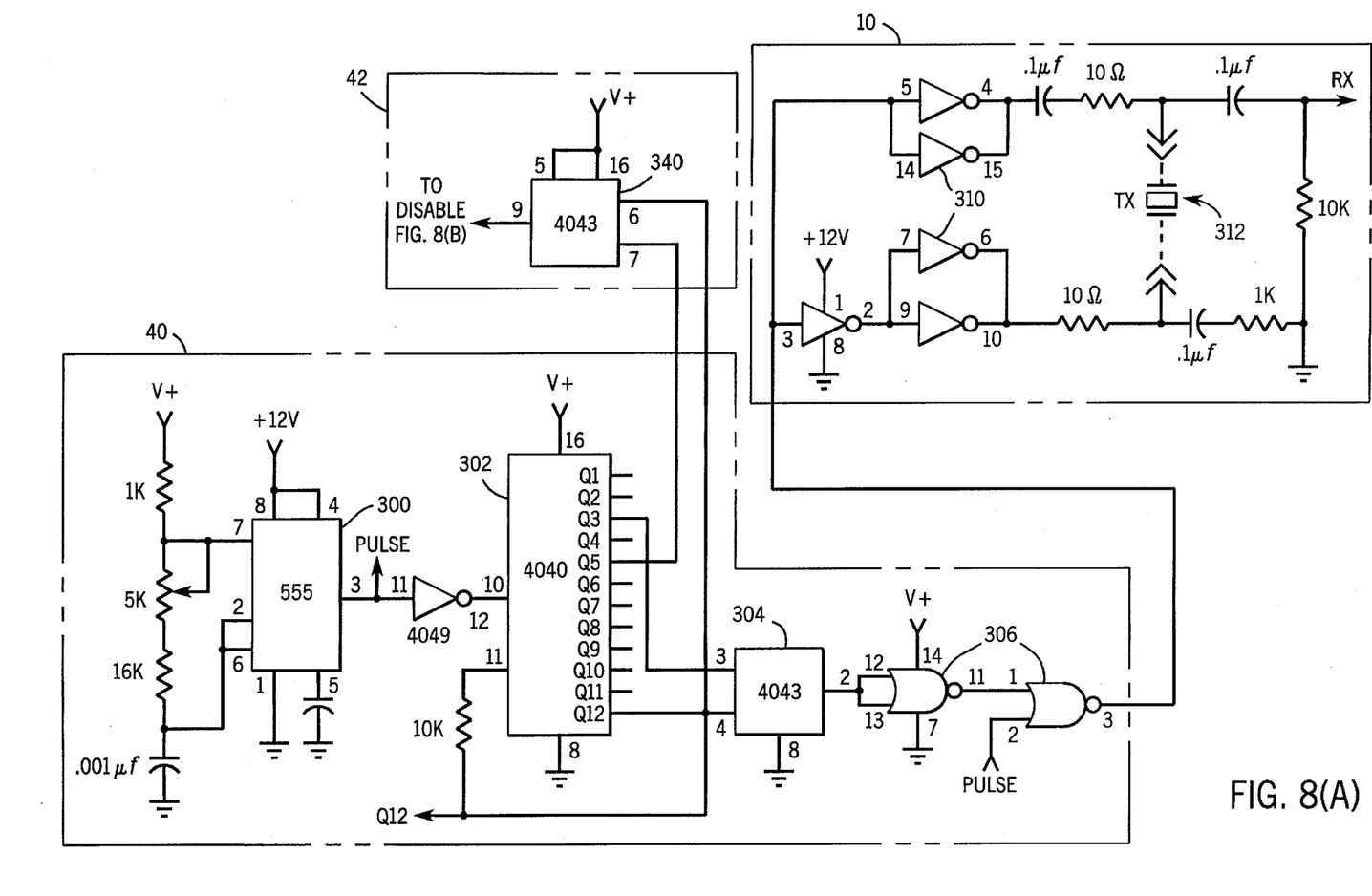
FIG. 8 is a circuit schematic of a system in accordance with the invention.
Figure 8B:
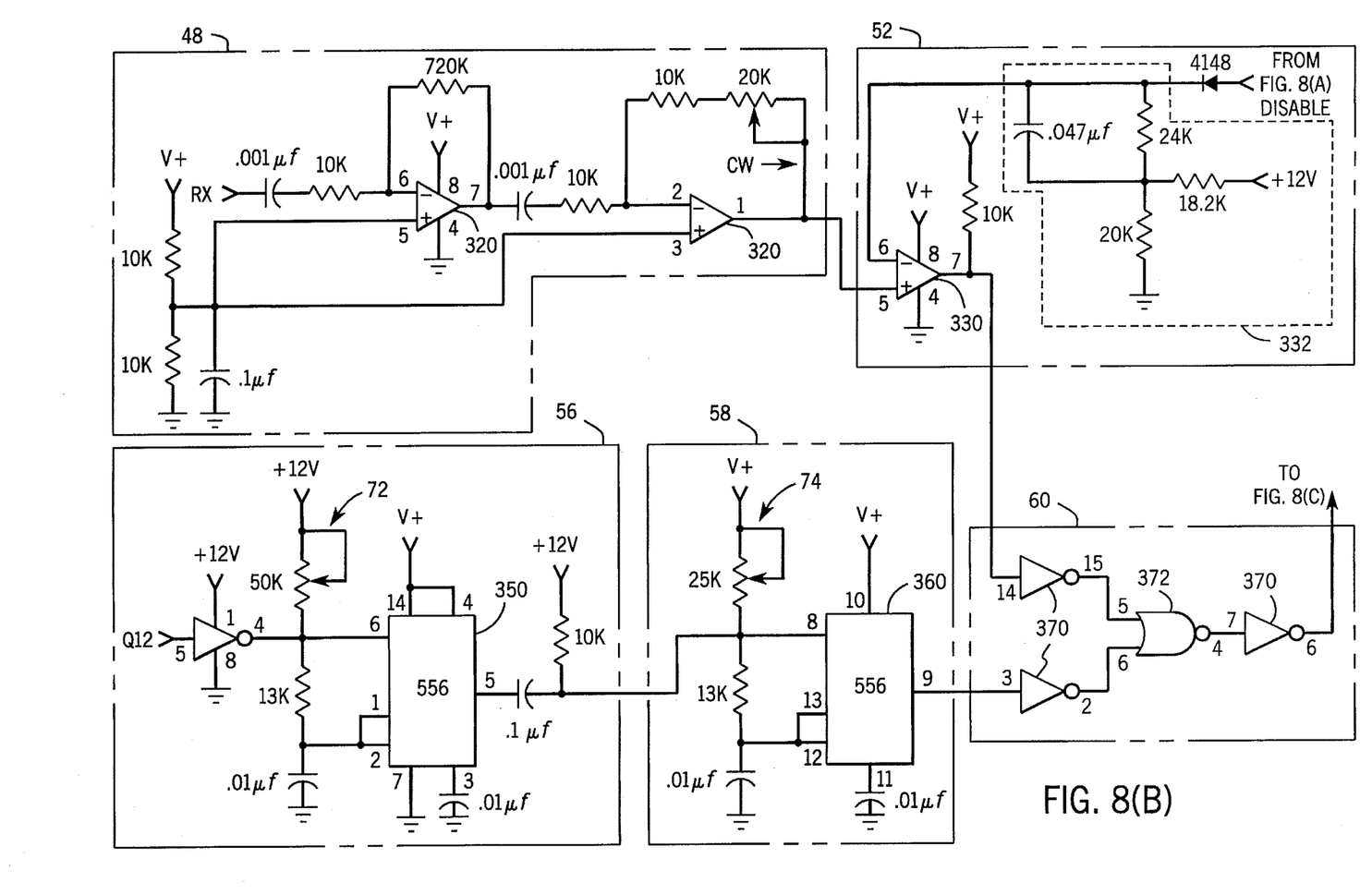
Figure 8C:
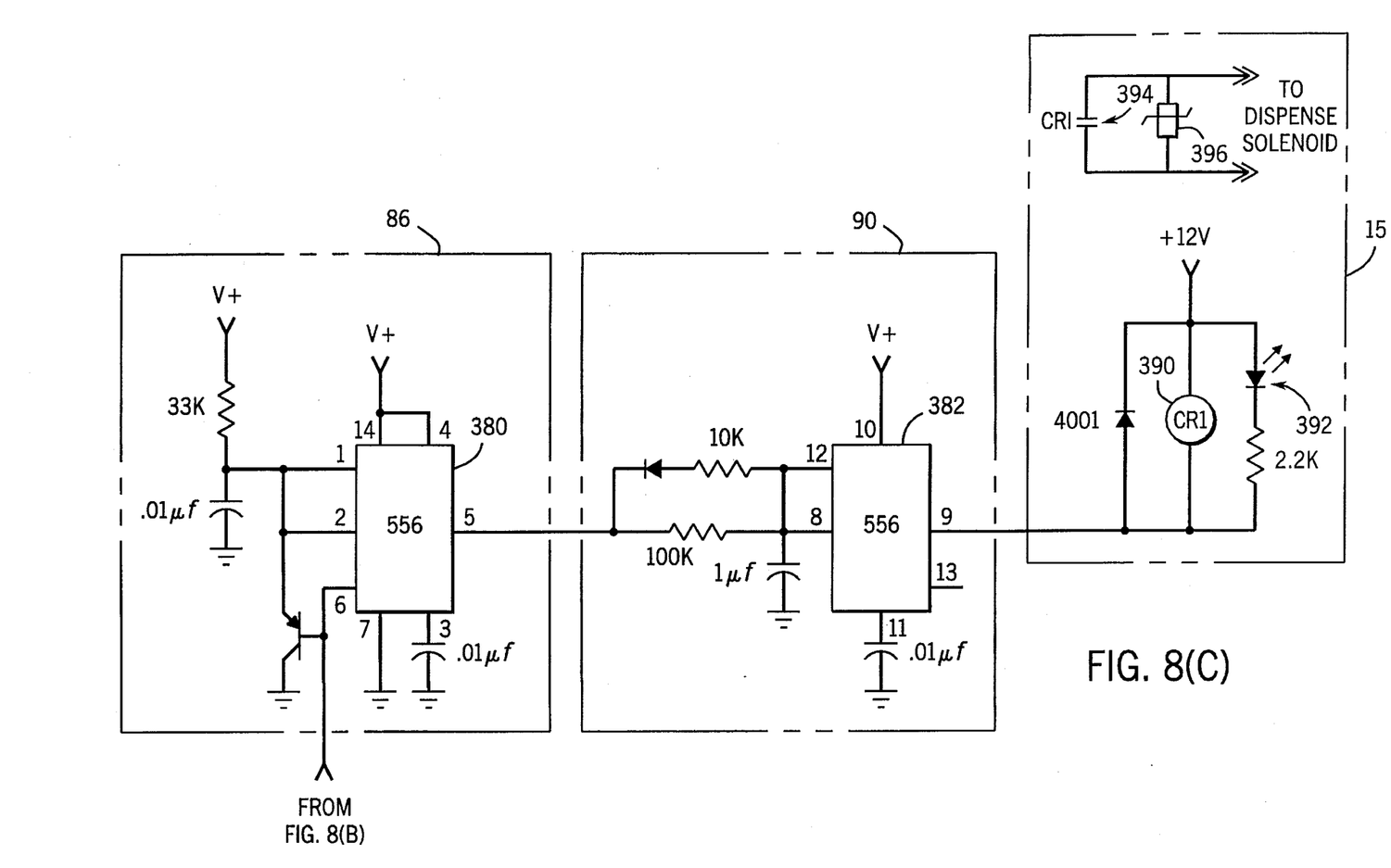

FIG. 8 is an electrical schematic implementing the system with discrete components, as is preferred due to lower production costs. The schematic includes resistor and capacitor values and common component part numbers to easily implement the system. FIG. 8(A) shows clock 40 having a timer 300, a counter 302, an RS flip-flop 304, and logic gates 306 all connected in the usual fashion. Transceiver 10 has drivers 310 and a receiver/transmitter 312, which in the preferred embodiment is a muRata MA40B6. Amplifier 48, FIG. 8(B), comprises op-amps 320 connected in the usual fashion. Amplitude detector 52 has comparator 330 and reference signal circuit 332, all conventionally connected. Amplitude detector 52 is connected to disabler 42, FIG. 8(A), which comprises an RS flip-flop 340 connected to clock 40. First timer 56, FIG. 8(B), and second timer 58 have timers 350 and 360, and potentiometers 72 and 74, respectively. Synchronous checker 60 has inverters 370 and NOR gate 372, all conventionally connected. Missing pulse detector 86, FIG. 8(C), and ON-delay timer 90 have timers 380 and 382, respectively, and conventionally connected. Finally, dispenser 15 has coil relay 390, LED 392, contacts 394, and varistor 396, all connected in the usual fashion. Coil relay 390 activates contacts 394 which are connected to, and activate, a dispense solenoid (not shown).

Although amplitude detector 52, FIG. 8(B), has a fixed resistor reference signal circuit 332, it is contemplated that a potentiometer could be substituted for one of the fixed resistors, for example, the 18.2 K resistor. This modification will create a variable reference signal which the amplitude of the reflected signal is compared at comparator 330, thereby changing the target space boundaries, as previously described.

Figure 9:
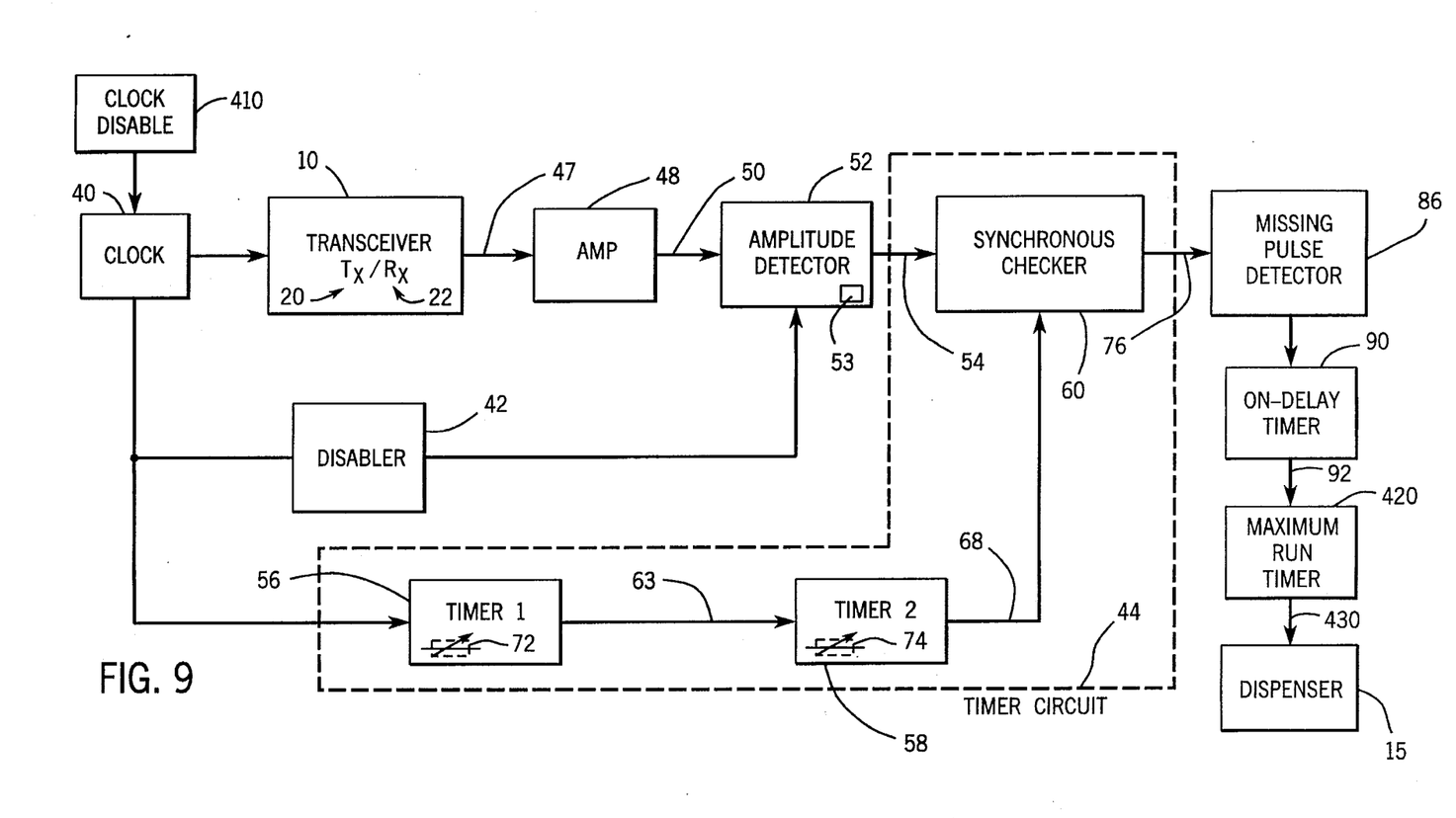
FIG. 9 is a block diagram in accordance with a further embodiment of the invention.

FIG. 9 is the block diagram of FIG. 3 with optional clock disable 410 and maximum run timer 420. Clock disable 410 is connected to clock 40 and is provided to disable clock 40 and thereby disable dispensing at an operator's discretion, for example during general cleaning of the dispenser and transceiver. Clock disable 410 can be implemented either with an external ON/OFF toggle switch, or a pushbutton switch with an internal timer to time out the clock disable. A second option comprises the addition of maximum run timer 420 connected between ON-delay timer 90 and dispenser 15. Maximum run timer 420 receives dispense signal 92 and produces maximum run signal 430 which activates dispenser 15 for a predetermined period of time, referred to as the maximum run time, for the time of dispensing product and deactivating the dispensing of product when the maximum run time expires. Preferably, the maximum run time is a period of time corresponding to the time it takes to fill the largest cup in a given application. Maximum run timer 420 is implemented with a timer and potentiometer, conventionally connected, wherein the potentiometer varies the maximum run time of the timer. Maximum run timer 420 is an option to place an upper limit on the amount of product dispensed.

An alterlative and equivalent to using the potentiometers in the timers and the amplitude detector would be the use of dip switches to provide a set of discrete settings for defining the target space in ON-delay, or the maximum run time. These and other equivalents, alternatives, and modifications are possible and within the scope of the appended claims.

We claim:

1. An ultrasonic detecting and dispensing control for detecting when an object is in a desired position and activating a dispenser in response to object position detection, the control comprising:

a clock circuit;

a transceiver connected to the clock circuit and having a transmitter portion and a receiver portion, the transmitter portion emitting ultrasonic signals having a cone-shaped dispersion path, the receiver portion receiving ultrasonic signals reflected by an object in the cone-shaped dispeiob reflected ultrasonic signals having an amplitude proportional to the distance between the object and the transceiver;

an amplitude detector connected to the transceiver to produce an amplitude signal when the amplitude of a reflected ultrasonic signal has a given relationship to a predetermined reference signal; and a timer circuit connected to the clock circuit and the amplitude detector, the timer circuit eating a timing window and producing a dispense signal suppliable to a dispenser for activating same-when the amplitude signal occurs within the timing window/and an arrangement in which the transceiver is placed to reflect ultrasonic signals from a substantial portion of the object to be detected when the object is in a target space below the dispenser, the target space being defined by the timing window and the predetermined reference siqnat such that the target space has minimum and maximum boundaries in which an object sufficiently within those boundaries activates the dispenser.

2. The control of claim 1 wherein the clock circuit comprises a counter causing the transmitter portion of the transceiver to emit a periodic series of pulsed ultrasonic signals.

3. The control of claim 1 further comprising a disable circuit connected to the clock and the amplitude detector to periodically disable the amplitude detector thereby ignoring rings and errant ultrasonic signals.

4. The control of claim 1 wherein the timer circuit comprises a timer connected to the clock circuit and creating a timing window; and
a synchronous checker connecting the amplitude detector and the timer to the dispenser, the synchronous checker producing the dispense signal when the amplitude signal is substantially synchronous with the timing window.

5. The control of claim 4 wherein the timer comprises:
a first timer connected to the clock circuit and producing a first timer output which establishes a leading edge of the timing window thereby defining a minimum distance the object can be to the transceiver to activate the dispenser; and
a second timer connected to the first timer and the synchronous checker, and producing a second timer output which establishes a trailing edge of the timing window thereby defining a maximum distance the object can be from the transceiver to activate the dispenser.

6. The control of claim 5 wherein the first and second timers each comprise a potentiometer to adjust the first and second timer outputs to thereby vary the timing window.

7. The control of claim 6 wherein adjusting the potentiometer of the first timer varies the leading edge of the timing window.

8. The control of claim 6 wherein adjusting the potentiometer of the second timer varies the trailing edge of the timing window.

9. The control of claim 1 wherein the amplitude detector comprises a comparator to compare the amplitude of the reflected ultrasonic signal to the predetermined reference signal and produce the amplitude signal when the amplitude is greater than the predetermined reference signal.

10. The control of claim 9 wherein the comparator compares the amplitude of the reflected ultrasonic signal to the predetermined reference signal to provide an indication of the relative proximity of the object to the transceiver radially outward from the transceiver and defines a radially outwardly boundary of a volumetric target space, said volumetric target space being further defined by the timing window.

11. The control of claim 10 wherein the timer circuit produces a dispense signal when the amplitude signal occurs within the timing window which indicates the presence of the object within the volumetric target space.

12. The control of claim 1 further comprising a missing pulse detector connected between the dispense and the timer circuit to interrupt dispensing if a dispense signal does not occur within a predetermined period of time.

13. The control of claim 1 further comprising an on-delay timer circuit connected between the dispenser and the timer circuit delaying the dispense signal a predetermined time to ensure that the object is in position.

14. The control of claim 1 further comprising a clock disable connected to the clock circuit to disable the=control.

15. The control of claim 1 further comprising a maximum run timer connected between the timer circuit and the dispenser deactivate the dispenser after a predetermined period of time from receiving a dispense signal.

16. An ultrasonic position detector for detecting the presence of a container within a predetermined target space and activating a dispenser, the ultrasonic position detector comprising:
a clock producing periodic clock pulses;
an ultrasonic transmitter emitting pulses of ultrasonic waves responsive to the clock pulses for supply to the target space;
an ultrasonic receiver detecting emitted ultrasonic waves reflected by a container in the target space, and producing a reflected signal in response to the detection;
an amplitude comparator comparing the reflected signal to a predetermined reference signal and producing a position indicative signal when the reflected signal has a given relationship to the predetermined reference signal; and
a timer creating a timing window such that when the position indicative signal occurs within the timing window, indicating that the container is in the target space, the timer produces a dispense signal suppliable to the dispenser for activating said, and wherein the timer comprises a timing window a adjuster for adjusting minimum and maximum boundaries of the target space.

17. The ultrasonic position detector of claim 16 wherein the timer further comprises:
a first timer responsive to the clock and producing a first timer signal;
a second timer responsive to the first timer and producing a second timer signal; and
a synchronous checker producing the activation signal when the second timer signal and the position indicative signal occur substantially synchronously.

18. The ultrasonic position detector of claim 16 further comprising:
a disabler responsive to the clock and disabling the amplitude comparator for a predetermined period of time so that the detector ignores errant signals and vibrations.

19. The ultrasonic position detector of claim 16 further comprising:
an on-delay responsive to the timer to delay activating the dispenser a predetermined time to ensure the object is in position in the target space.

20. The ultrasonic position detector of claim 16 further comprising a missing pulse detector responsive to the timer to deactivate the dispenser when a dispense signal does not occur within a predetermined time.

21. The ultrasonic position detector of claim 16 further comprising an amplifier to amplify the reflected signal.

22. The ultrasonic position detector of claim 16 further comprising a microprocessor connecting the ultra-sonic transmitter and receiver to the dispenser.

23. The control of claim 16 further comprising a clock disable connected to the clock to disable the ultrasonic position detector.

24. The control of claim 16 further comprising a maximum run timer responsive to the dispense signal to deactivate the dispenser after a predetermined period of time after receiving the dispense signal.

25. A method of automatically dispensing a product in response to an object located in a predetermined target space comprising the steps of:
emitting ultrasonic waves having a dispersion path defining the target space below a dispenser;

placing the object in the target space such that the object is sufficiently located under the dispenser to an extent necessary to receive dispensed product, said object reflecting at least a portion of the emitted ultrasonic wave;

receiving ultrasonic waves reflected by the object in the dispersion path;

creating a timing window by setting minimum and maximum time limits for the time it takes the ultrasonic wave to be emitted, reflected, and received, which settings determine minimum and maximum boundaries of the target space as measured from where the ultrasonic waves are emitted;

timing how long it takes an ultrasonic wave to be emitted, reflected, and received;

determining that the timing of the ultrasonic wave is within the minimum and maximum time limits;

comparing the amplitude of the received ultrasonic wave to a predetermined parameter thereby determining if the object is sufficiently located within the target space laterally and vertically; and dispensing product when the received ultrasonic wave satisfies the amplitude comparing step and the timing determining step.

26. The method of claim 25 further comprising the step of:

delaying dispensing for a predetermined time to ensure the object is sufficiently within the target space.

27. The method of claim 25 further comprising the step of:

turning the dispenser off when either of the amplitude comparing step and the timing determining step are not satisfied after the dispensing of product is commenced.

28. The method of claim 27 wherein the step of dispensing defines the target space as a volumetric space wherein the object is sufficiently positioned under a dispensing spigot to receive dispensed product without spillage during the step of dispensing, and remaining sufficiently positioned under the dispensing spigot during the step of turning the dispenser off to further avoid spillage.

29. The method of claim 25 wherein the step of emitting an ultrasonic wave further comprises emitting a periodic series of ultrasonic wave pulses.

30. The method of claim 29 further comprising the step of:

disabling the amplitude comparing step for a predetermined time while emitting each series of ultrasonic wave pulses.

31. The method of claim 25 further comprising the step of disabling dispensing product to allow cleaning.

32. The method of claim 25 further comprising the step of setting a maximum run time for the time of dispensing product and deactivating dispensing product when the maximum run time expires.

33. An ultrasonic detecting and dispensing control for detecting when an object is in a desired position and activating a dispenser in response to object position detection, the control comprising:

a clock circuit;

a transceiver connected to the clock circuit and having a transmitter portion and a receiver portion, the transmitter portion emitting ultrasonic signals having a cone-shaped dispersion path, the receiver portion receiving ultrasonic signals reflected by an object in the cone-shaped dispersion path, the reflected ultrasonic signals having an amplitude proportional to the distance between the object and the transceiver;

an amplitude detector connected to the transceiver to produce an amplitude signal when the amplitude of a reflected ultrasonic signal has a given relationship to a predetermined reference signal;

a timer circuit connected to the clock circuit and the amplitude detector and creating a timing window to produce a dispense signal activating the dispenser when the amplitude signal occurs within the timing window, and wherein the timer circuit comprises a timer connected to the clock-circuit and a synchronous checker connecting the amplitude detector and, the timer to the dispenser, the synchronous checker producing the dispense signal when the amplitude signal is substantially synchronous with the timing window, and wherein the timer comprises a first timer connected to the clock circuit and producing a first timer output which establishes a leading edge of the timing window thereby defining a minimum distance the object can be to the transceiver to activate the dispenser, and a second timer connected to the first timer and the synchronous checker and producing a second timer output which establishes a trailing edge of the timing window thereby defining a maximum distance the object can be from the transceiver to activate the dispenser, wherein the first and second timers each comprise a potentiometer to adjust the first and second timer outputs to thereby vary the timing window.

34. The control of claim 33 wherein adjusting the potentiometer of the first timer varies the leading edge of the timing window.

35. The control of claim 33 wherein adjusting the potentiometer of the second timer varies the trailing edge of the timing window.

* * * * *

UNITED STATES PATENT AND TRADEMARK OFFICE
CERTIFICATE OF CORRECTION

PATENT NO. : 5,573,041
DATED : November 12, 1996
INVENTOR(S) : Skell, Daniel G., et al Page 1 of 2

It is certified that error appears in the above-indentified patent and that said Letters Patent is hereby corrected as shown below:

Column 1, lines 56-57, delete "H" and "ösel" and replace with -- Hösel -- ;
Column 2, line 25, delete "." between the comma and "distance";
Column 3, line 46, delete "-" between "the" and "minimum";
Column 4, line 22, after "FIG. 8", insert -- A-C -- ;
Column 5, line 29, delete "." after 72;
Column 5, line 41, delete "6" and substitute therefor -- 46 -- ;
Column 7, line 18, delete "=" between "the" and "second";
Column 7, line 19, delete "=" between "amplitude" and "detector";
Column 7, line 24, delete "." after "cleared";
Column 8, line 3, after "signal", insert -- to -- ;
Claim 1, line 11, delete "dispeiob" and substitute therefor -- dispersion path, the -- ;
Claim 1, line 19, delete "eating" and substitute therefor -- creating -- ;
Claim 1, line 21, delete "-" between "same" and "when";
Claim 1, line 22, delete "window/and" and substitute therefor -- window; and -- ;
Claim 1, line 28, delete "signat" and substitute therefor -- signal -- ;

UNITED STATES PATENT AND TRADEMARK OFFICE
CERTIFICATE OF CORRECTION

PATENT NO. : 5,573,041
DATED : November 12, 1996
INVENTOR(S) : Skell, Daniel G., et al It is certified that error appears in the above-indentified patent and that said Letters Patent is hereby corrected as shown below:

Column 9:

Claim 12, line 2, delete "dispense" and substitute therefor -- dispenser -- ;
Claim 14, line 2, delete "=" between "the" and "control";
Claim 15, line 3, insert --to-- between "dispenser" and "deactivate";

Column 10:

Claim 16, line 21, delete "said" and substitute therefor -- same -- ;
Claim 16, line 22, delete the second occurrence of "a";

Column 12:

Claim 33, line 23, delete "-" between "clock" and "circuit";
Claim 33, line 24, delete "," after "and".

Signed and Sealed this

Fourth Day of February, 1997

Attest:

BRUCE LEHMAN

Attesting Officer

Commissioner of Patents and Trademarks